3,248,406
1,2-DIMETHYL ANDROSTANE DERIVATIVES

James C. Orr, Lincoln, Mass., assignor to Syntex Corporation, Panama, Panama, a corporation of Panama
No Drawing. Filed Aug. 16, 1963, Ser. No. 302,733
14 Claims. (Cl. 260—397.4)

The present invention relates to novel cyclopentanophenanthrene derivatives and to a process for the production thereof.

More particularly, the present invention relates to novel 1,2-dimethyl androstane derivatives.

The novel compounds of the present invention are represented by the following formulae:

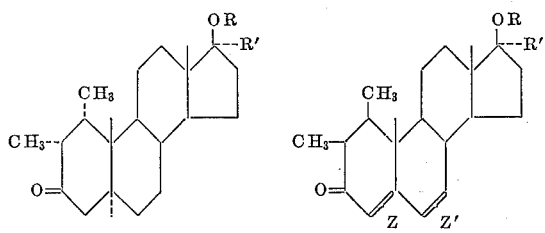

In the above formulae R represents hydrogen or a hydrocarbon carboxylic acyl group of less than 12 carbon atoms; R¹ represents hydrogen, lower alkyl, lower alkenyl or lower alkinyl; Z represents a double bond or a saturated linkage each between C–4 and C–5; and Z¹ represents a double bond or a saturated linkage each between C–6 and C–7.

The acyl group is derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel compounds of the present invention are prepared by the process exemplified as follows:

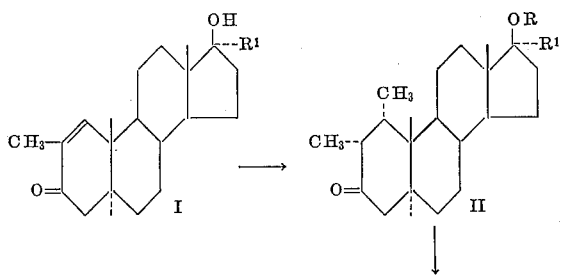

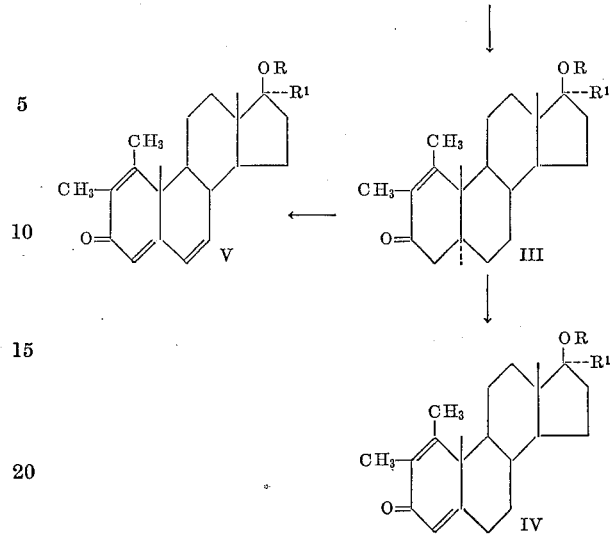

In the above formulae R and R¹ have the same meaning as set forth hereinbefore.

In practicing the process outlined above, the starting 2-methyl-Δ¹-androsten-17β-ol-3-one derivative (I) is treated with methyl magnesium bromide in the presence of cuprous or cupric chloride, preferably in tetrahydrofuran at room temperature for about 2 hours, and then with a mineral acid such as hydrochloric acid, thus yielding the corresponding 1α,2α-dimethyl-androsten-17β - ol-3-one compound (II), which upon treatment with 2,3-dichloro-5,6-dicyano-1,4-benzoquinone, preferably in dioxane at approximately 60° C. for about 24 hours, yields the corresponding 1,2-dimethyl-Δ¹-androsten-17β-ol-3-one (III).

The latter 1,2-dimethyl-Δ¹-androsten-17β-ol-3 - one (III) is treated with excess 2,3-dichloro-5,6-dicyano-1,4-benzoquinone in the presence of benzoic acid, and preferably in dioxane at reflux temperature for about 10 hours, thus furnishing, after chromatographic separation of the obtained compounds, the corresponding 1,2-dimethyl-Δ¹,⁴-androstadien-17β-ol-3-one (IV) and 1,2-dimethyl-Δ¹,⁴,⁶-androstatrien-17β-ol-3-one compounds (V).

The compounds of the present invention having a secondary hydroxyl group are conveniently acylated in pyridine with an acylating agent such as an anhydride or a chloride of a hydrocarbon carboxylic acid of the type described hereinbefore, to give the corresponding acylates.

The compounds of the present invention having in the molecule a secondary and/or a tertiary hydroxyl group are conventionally esterified in the presence of p-toluenesulfonic acid with an acylating agent such as acetic anhydride, caproic anhydride, cyclopentylpropionic anhydride or enanthic anhydride, to produce the corresponding esters.

The following specific examples serve to illustrate but are not intended to limit the scope of the present invention.

PREPARATION 1

A mixture of 5 g. of androstan-17β-ol-3-one in 40 cc. of anhydrous thiophene-free benzene, 2 cc. of ethyl formate and 1.5 g. of sodium hydride was stirred for 8 hours under nitrogen. The sodium salt of the resulting 2-hydroxymethylene derivative and the excess hydride were filtered off, washed with benzene, then hexane and dried in vacuo. Cautious precipitation in excess ice-cold dilute hydrochloric acid gave the crude free 2-hydroxymethylene derivative which was filtered off, washed with water and air-dried. 1 g. of the product was hydrogenated for approximately 24 hours in 15 cc. of methanol over 0.4 g. of prehydrogenated 10% palladium carbon catalyst at 25° C. and 570 mm. pressure until two moles of hydrogen were taken up. The mixture was filtered, the catalyst washed with hot methanol and the combined solutions evaporated to dryness. Crystallization from acetone-hexane yielded 2α-methylandrostan-17β-ol-3-one.

A solution of 1.1 molar equivalents of bromine in 10 cc. of glacial acetic acid was added dropwise with stirring to a solution of 1 g. of the latter compound in 15 cc. of glacial acetic acid containing a few drops of hydrogen bromide in acetic acid. After 4 hours at room temperature, water was added and the crude amorphous bromide was collected.

The total bromo compound was refluxed for 90 minutes with 4.5 cc. of γ-collidine and 4.5 cc. of 2,4-lutidine under anhydrous conditions. The solution was cooled, the precipitate removed and the filtrate was diluted with ether, washed with dilute hydrochloric acid, sodium carbonate solution and water. The dried extract was evaporated and the residue was chromatographed on neutral alumina. Crystallization of the fractions eluted with benzene from acetone-ether produced 2-methyl-$\Delta^1$-androsten-17β-ol-3-one.

PREPARATION 2

A mixture of 5 g. of 2-methyl-$\Delta^1$-androsten-17β-ol-3-one 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3 - cycloethylenedioxy-2-methyl-$\Delta^1$-androsten-17β-ol.

A solution of 4 g. of the later compound in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-cycloethylenedioxy-2-methyl-$\Delta^1$-androsten-17-one.

A solution of 3 g. of the latter steroid in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-cycloethylenedioxy-2,17α-dimethyl-$\Delta^1$-androsten-17β-ol.

The latter procedure was repeated, except that there were used vinyl and ethinyl magnesium bromides instead of methyl magnesium bromide, thus giving respectively: 3 - cycloethylenedioxy - 2-methyl-17α-vinyl-$\Delta^1$-androsten-17β-ol and 3-cycloethylenedioxy-2-methyl-17α-ethinyl-$\Delta^1$-androsten-17β-ol.

A solution of 2.0 g. of 3-cycloethylenedioxy-2,17α-dimethyl-$\Delta^1$-androsten-17β-ol in 70 cc. of methanol and 7 ml. of 8% aqueous sulfuric acid was refluxed for 40 minutes. It was then neutralized with saturated sodium carbonate solution, concentrated to ca. 20 ml. in vacuo and poured into water. The formed precipitate was filtered off and washed thoroughly with water. Recrystallization from acetone gave 2,17α-dimethyl-$\Delta^1$-androsten-17β-ol-3-one.

The aforesaid 17α-vinyl and ethinyl compounds were treated by the same procedure, thus giving respectively: 2 - methyl - 17α - vinyl - $\Delta^1$ - androsten-17β-ol-3-one and 2-methyl-17α-ethinyl-$\Delta^1$-androsten-17β-ol-3-one.

Example I

To a mixture of 1 g. of 2-methyl-$\Delta^1$-androsten-17β-ol-3-one, 1 g. of cuprous chloride and 30 cc. of anhydrous tetrahydrofuran was added, while stirring and cooling, 30 cc. of tetrahydrofuran, containing 3 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 1α,2α-dimethyl-androstan-17β-ol-3-one (cpd. No. 1).

The compounds listed hereinafter under A were treated according to the above procedure, thus yielding the corresponding products set forth under B:

| A | Cpd. No. | B |
|---|---|---|
| 2,17α-dimethyl-$\Delta^1$-androsten-17β-ol-3-one. | 2 | 1α,2α17α-trimethyl-androstan-17β-ol-3-one. |
| 2-methyl-17α-vinyl-$\Delta^1$-androsten-17β-ol-3-one. | 3 | 1α,2α-dimethyl-17α-vinyl-androstan-17β-ol-3-one. |
| 2-methyl-17α-ethinyl-$\Delta^1$-androsten-17β-ol-3-one. | 4 | 1α,2α-dimethyl-17α-ethinyl-androstan-17β-ol-3-one. |

Example II

A mixture of 500 mg. of compound No. 1, 10 cc. of dioxan and 350 mg. of 2,3-dichloro-5,6-dicyano-1,4-benzoquinone was kept at 60° C. for 24 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 1,2-dimethyl-$\Delta^1$-androsten-17β-ol-3-one (cpd. No. 5).

The compounds Nos. 2, 3, and 4 were treated by the same procedure, thus yielding respectively:

Compound No.:
  6. 1,2,17α-trimethyl-$\Delta^1$-androsten-17β-ol-3-one,
  7. 1,2-dimethyl-17α-vinyl-$\Delta^1$-androsten-17β-ol-3-one,
  8. 1,2 - dimethyl - 17α - ethinyl-$\Delta^1$-androsten-17β-ol-3-one.

Example III

A mixture of 500 mg. of compound No. 5, 10 cc. of dioxan, 1 g. of 2,3-dichloro-5,6-dicyano-1,4-benzoquinone and 1 g. of benzoic acid was refluxed for 10 hours. It was then cooled, filtered and the filtrate evaporated to dryness. The residue was chromatographed on 40 g. of alumina thus yielding two fractions consisting of 1,2-dimethyl-$\Delta^{1,4}$-androstadien-17β-ol-3-one (cpd. No. 9) and 1,2-dimethyl-$\Delta^{1,4,6}$-androstatrien-17β-ol-3-one (cpd. No. 10).

Upon treatment by the same procedure, compound No. 6 gave:

1,2,17α - trimethyl - $\Delta^{1,4}$-androstadien-17β-ol-3-one (cpd. No. 11) and 1,2,17α-trimethyl-$\Delta^{1,4,6}$-androstatrien-17β-ol-3-one (cpd. No. 12); compound No. 7 gave:

1,2 - dimethyl - 17α - vinyl-$\Delta^{1,4}$-androstadien-17β-ol-3-one (cpd. No. 13) and 1,2-dimethyl-17α-vinyl-$\Delta^{1,4,6}$-androstratrien-17β-ol-3-one (cpd. No. 14); and compound No. 8 gave:

1,2 - dimethyl - 17α-ethinyl-Δ¹,⁴-androstadien-17β-ol-3-one (cpd. No. 15) and 1,2-dimethyl-17α-ethinyl-Δ¹,⁴,⁶-androstatrien-17β-ol-3-one (cpd. No. 16).

*Example IV*

A mixture of 1 g. of compound No. 1, 4 cc. of pyridine and 2 cc. of acetic anhydride was kept at room temperature overnight, poured into ice water, the formed precipitate was filtered, washed with water and dried. Crystallization from acetone-hexane gave 1α,2α-dimethyl-androstan-17β-ol-3-one acetate (cpd. No. 17).

The compounds Nos. 5, 9 and 10 were treated by the above procedure, thus giving respectively:

Compound No.:
18. 1,2-dimethyl-Δ¹-androsten-17β-ol-3-one acetate.
19. 1,2 - dimethyl - Δ¹,⁴ - androstadien - 17β-ol-3-one acetate,
20. 1,2 - dimethyl - Δ¹,⁴,⁶-androstatrien-17β-ol-3-one acetate.

*Example V*

The starting compounds of Example IV were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

*Example VI*

To a solution of 5 g. of compound No. 2 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 1α,2α,17α - trimethyl - androstan-17β-ol-3-one caproate (cpd. No. 21).

The compounds Nos. 3, 4, 6, 7, 8, 11, 12, 13, 14, 15, and 16 were treated by the same procedure, thus affording the corresponding 17-caproates.

*Example VII*

The starting compounds of Example VI were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates and cyclopentylpropionates of said starting compounds.

I claim:
1. A compound of the following formula:

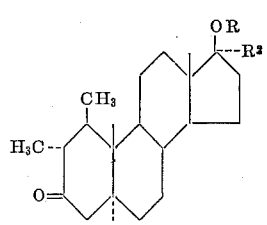

wherein R is selected from the group consisting of hydrogen and a hydrocarbon carboxylic acyl group of less than 12 carbon atoms and R² represents a lower alkenyl group.

2. A compound of the following formula:

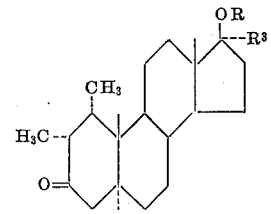

wherein R is selected from the group consisting of hydrogen and a hydrocarbon carboxylic acyl group of less than 12 carbon atoms and R³ represents a lower alkenyl group.

3. 1α,2α-dimethyl-17α-vinyl-androstan-17β-ol-3-one.
4. 1α,2α - dimethyl-17α-ethinyl-androstan-17β-ol-3-one.
5. A compound of the following formula:

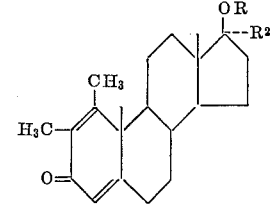

wherein R is selected from the group consisting of hydrogen and a hydrocarbon carboxylic acyl group of less than 12 carbon atoms and R² represents a lower alkenyl group.

6. A compound of the following formula:

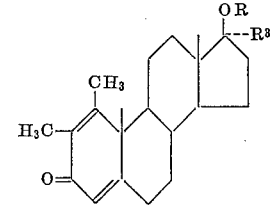

wherein R is selected from the group consisting of hydrogen and a hydrocarbon carboxylic acyl group of less than 12 carbon atoms and R³ represents a lower alkenyl group.

7. 1,2 - dimethyl-17α-vinyl-Δ¹,⁴-androstadien-17β-ol-3-one.
8. 1,2 - dimethyl-17α-ethinyl-Δ¹,⁴-androstadien-17β-ol-3-one.
9. A compound of the following formula:

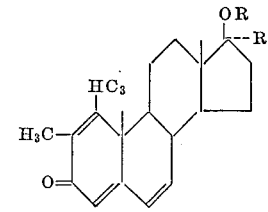

wherein R is selected from the group consisting of hydrogen and a hydrocarbon carboxylic acyl groups of less than 12 carbon atoms and R³ represents a lower alkinyl group.

10. A compound of the following formula:

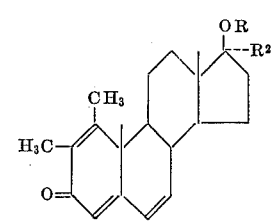

wherein R is selected from the group consisting of hydrogen and a hydrocarbon carboxylic acyl groups of less than 12 carbon atoms and R² represents a lower alkenyl group.

11. A compound of the following formula:

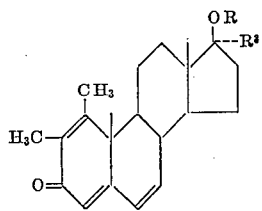

wherein R is selected from the group consisting of hydrogen and a hydrocarbon carboxylic acyl group of less than 12 carbon atoms and R³ represents a lower alkinyl group.

12. 1,2 - dimethyl-17α-vinyl-Δ$^{1,4,6}$-androstatrien-17β-ol-3-one.

13. 1,2 - dimethyl-17α-ethinyl-Δ$^{1,4,6}$-androstatrien-17β-ol-3-one.

14. 1,2,17α - trimethyl - Δ$^{1,4,6}$-androstatrien-17β-ol-3-one.

References Cited by the Examiner

UNITED STATES PATENTS

| | | | |
|---|---|---|---|
| 3,073,850 | 1/1963 | Weichert | 260—397.4 |
| 3,092,644 | 6/1963 | Clinton | 260—397.4 |
| 3,134,792 | 5/1964 | Kaspar et al. | 260—397.4 |
| 3,153,647 | 10/1964 | Shapiro et al. | 260—239.55 |

OTHER REFERENCES

Counsell et al.: "J. Org. Chem.," vol. 27 (1962), pages 248–253.

LEWIS GOTTS, *Primary Examiner.*